United States Patent [19]
Yang

[11] Patent Number: 6,095,176
[45] Date of Patent: Aug. 1, 2000

[54] MIXING VALVE FOR HOT AND COLD WATER

[76] Inventor: Tsai Chen Yang, P.O. Box 63-99, Taichung, Taiwan, 406

[21] Appl. No.: 09/282,069

[22] Filed: Mar. 29, 1999

[51] Int. Cl.[7] .................................................. G05D 11/16
[52] U.S. Cl. ...................... 137/98; 137/100; 137/454.6; 137/607
[58] Field of Search .................... 137/98, 100, 454.6, 137/607

[56] References Cited

U.S. PATENT DOCUMENTS

| 5,425,394 | 6/1995 | Clare | 137/100 |
| 5,445,181 | 8/1995 | Kuhn et al. | 137/98 |
| 5,730,171 | 3/1998 | Niakan | 137/98 |
| 5,749,393 | 5/1998 | Yang | 137/454.2 |

*Primary Examiner*—Stephen M. Hepperle

[57] ABSTRACT

A mixing valve includes a housing having two inlets for receiving cold water and hot water. A valve member is secured in the housing and includes a membrane that may be easily secured between two casings. A valve stem is slidably engaged in the casings and has a middle portion secured to the membrane. The valve stem has two valve elements for engaging with the valve seats of the casings and for blocking the hot water when the cold water is not supplied to the housing. One or more control valves may be exchangeably secured to the valve member.

1 Claim, 6 Drawing Sheets

MIXING VALVE FOR HOT AND COLD WATER

BACKGROUND OF THE INVENTION

1. Field of the Invention

The present invention relates to a valve, and more particularly to a mixing valve for hot and cold water.

2. Description of the Prior Art

Two typical mixing valves for faucets are disclosed in U.S. Pat. No. 5,445,181 to Kuhn et al. and U.S. Pat. No. 5,730,171 to Niakan. The faucets comprise an integral structure having another control valve received therein for controlling the actuation of the mixing valve. However, the control valve may not be replaced or changed with the other water control.

The present invention has arisen to mitigate and/or obviate the afore-described disadvantages of the conventional valves.

SUMMARY OF THE INVENTION

The primary objective of the present invention is to provide a mixing valve for hot and cold water, in which the mixing valve includes a control valve that may be changed or replaced with the other control valve for allowing the valve to be easily manufactured and assembled.

In accordance with one aspect of the invention, there is provided a mixing valve comprising a housing including two inlets for receiving water, a valve member secured in the housing, the valve member including two casings secured together, the casings each including an inlet for communicating with the inlets of the housing and each including a valve opening and a valve seat and each including an annular shoulder, a membrane including a peripheral bead engaged in the annular shoulders of the casings and secured in place by the casings, the membrane including an annular bulge for defining an annular recess and for increasing a resilience of the membrane, the membrane including a center hole, and a valve stem including two ends slidably engaged in the valve openings of the casings and including a middle portion engaged through the center hole of the membrane and secured to the membrane, the valve stem including two valve elements for engaging with the valve seats of the valve member. A first of the valve elements is caused to engage with a first of the valve seats for blocking the water from a first of the inlets of the housing when the water is not supplied to a second of the inlets of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
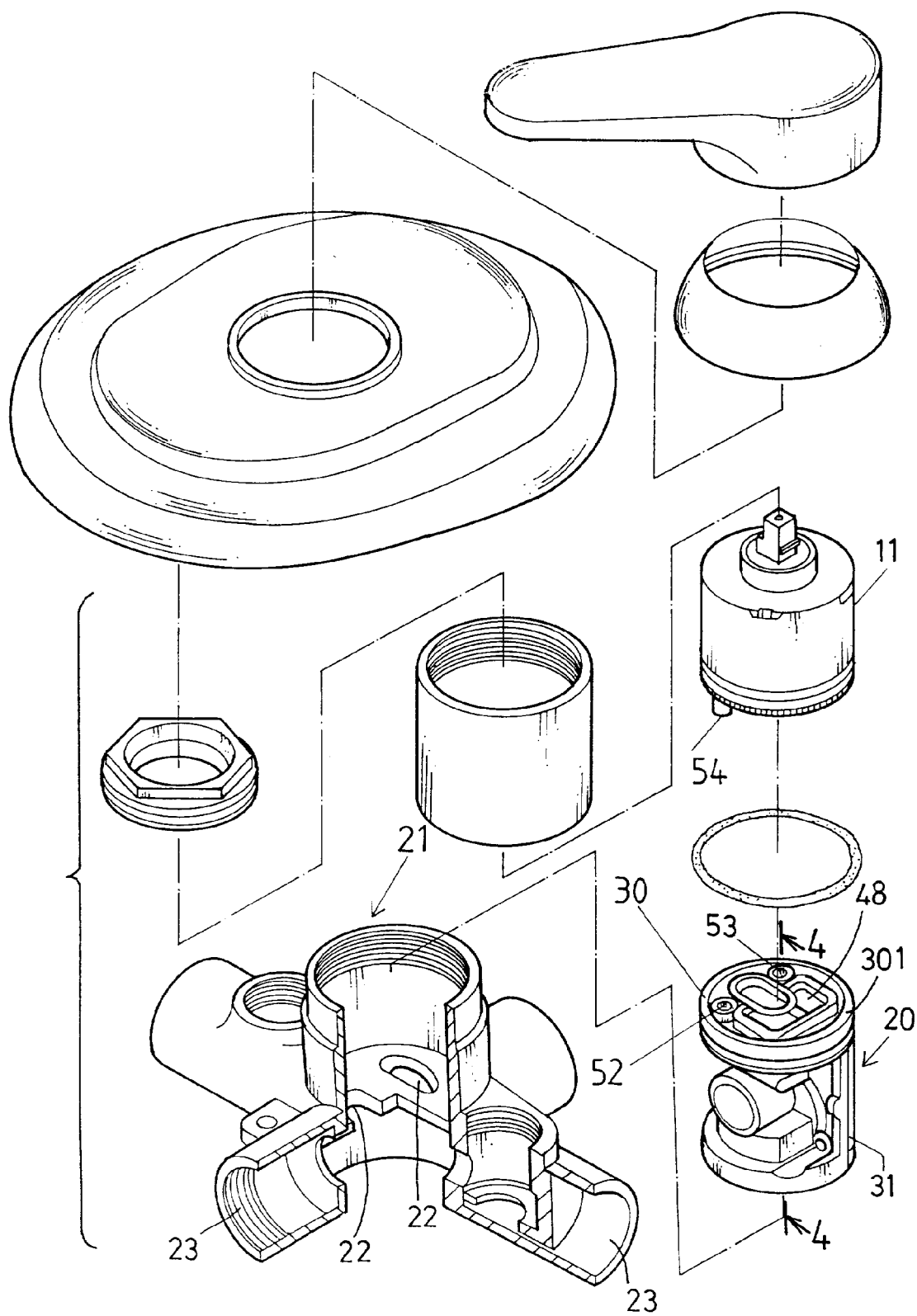
FIG. 1 is a partial exploded view of a mixing valve in accordance with the present invention.
Figure 2:
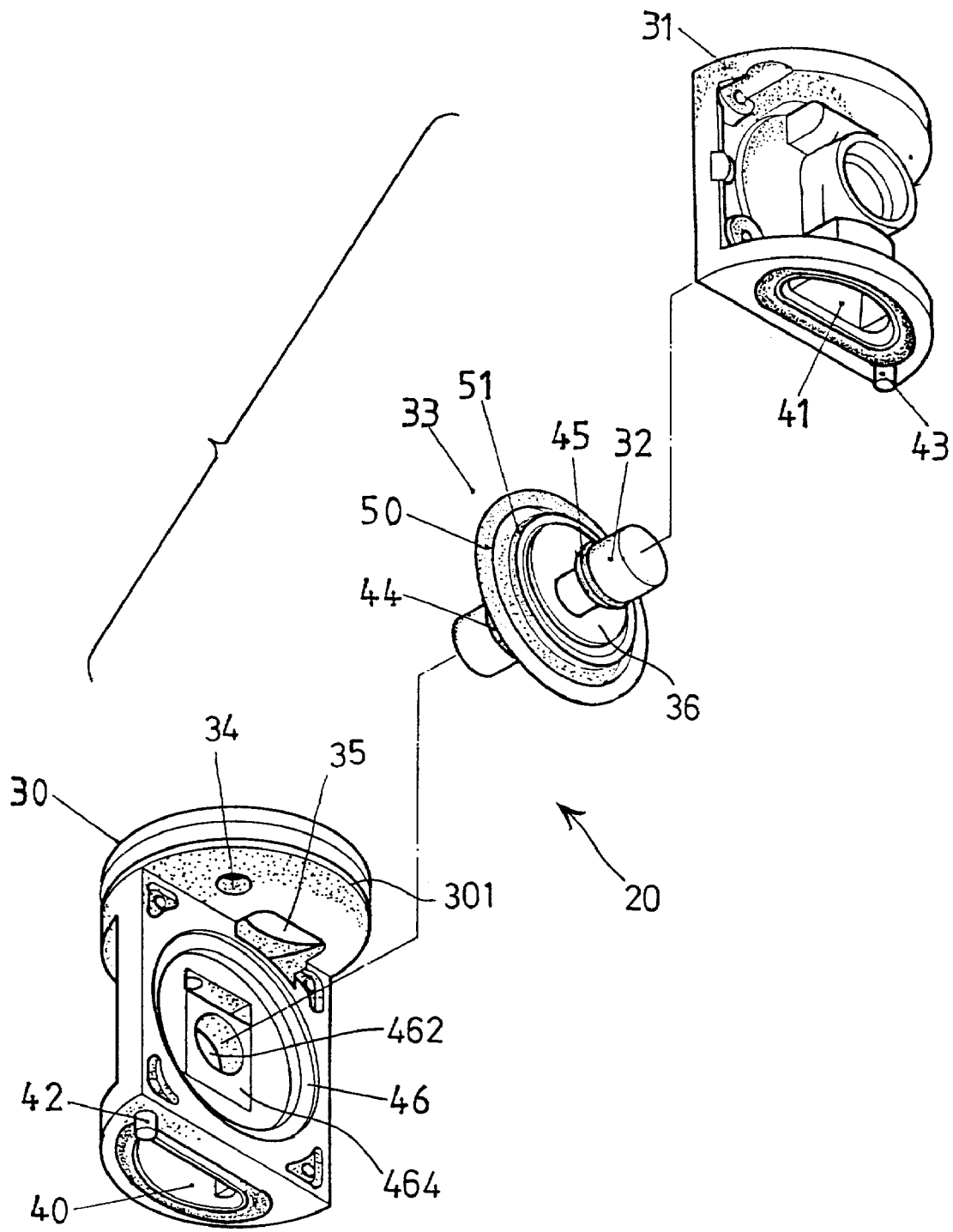
FIG. 2 is a partial exploded view of a valve member.
Figure 3:
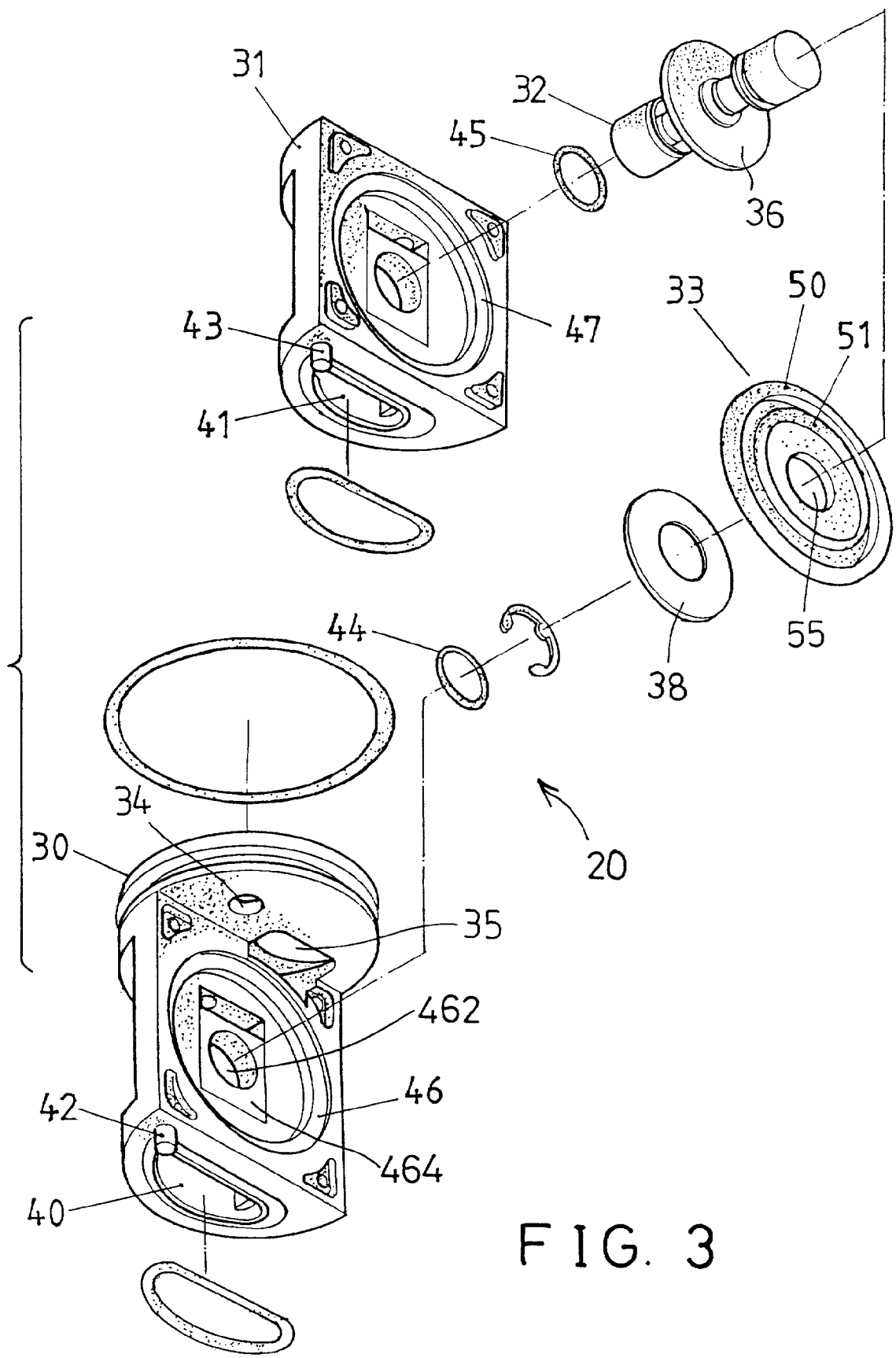
FIG. 3 is a detailed exploded view of the valve member.

Referring to the drawings, and initially to FIGS. 1–4, a mixing valve in accordance with the present invention comprises a housing 21 including two inlets 22 coupling to two inlet pipes 23 for allowing cold water and hot water to flow into the housing 21. A valve member 20 is engaged in the housing 21 and includes two inlets 40, 41 (FIGS. 2–5) communicating with the inlets 22 respectively, and includes two outlets 48 (FIGS. 1, 4, 5) for allowing cold water and hot water to flow out of the valve member 20 and to flow into a mixing chamber of a control valve 11 for mixing the hot water and the cold water.

Figure 4:
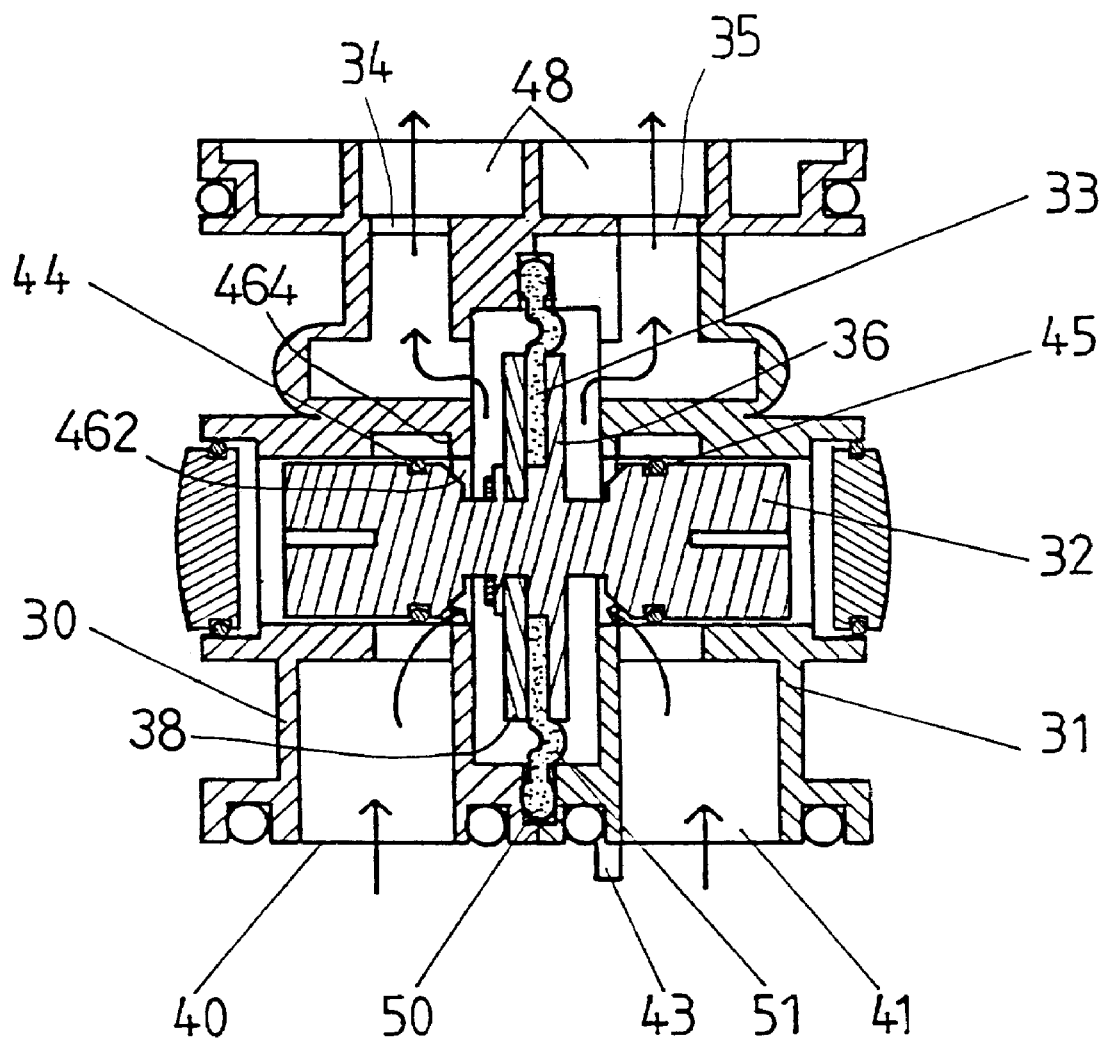
FIG. 4 is a cross sectional view taken along lines 4—4 of FIG. 1.
Figure 5:
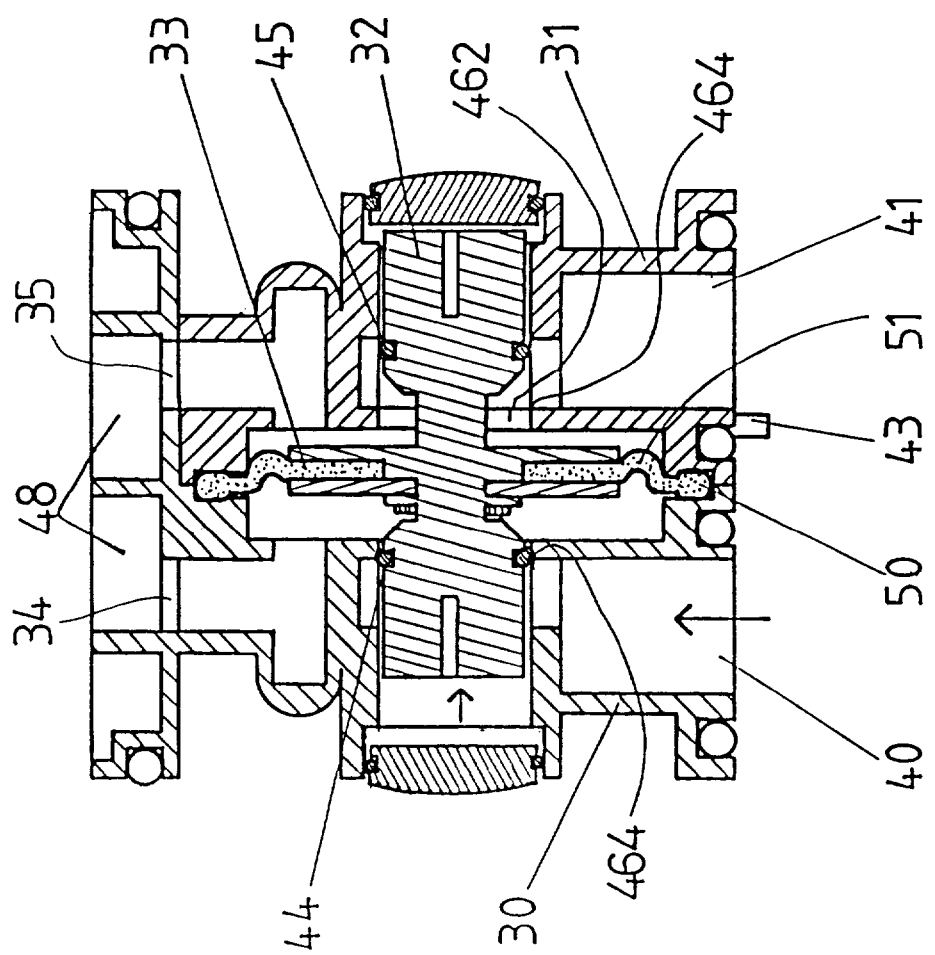
FIG. 5 is a cross sectional view similar to FIG. 4, illustrating the operation of the mixing valve.

The valve member 20 includes two casings 30, 31 each having one or more projections 42, 43 for engaging with the housing 21 and for allowing the casings 30, 31 to be solidly secured to the housing 21. The inlets 40, 41 of the valve member 20 are formed in the casings 30, 31 respectively for communicating with the inlets 22 of the housing 21. The casings 30, 31 each includes an annular shoulder 46, 47 for engaging with the peripheral portion of the membrane 33 (FIGS. 4, 5). As best shown in FIG. 4, the membrane 33 includes a peripheral bead 50 for forming as a sealing ring and for being engaged in the annular shoulders 46, 47 of the casings 30, 31 and for allowing the membrane 33 to be clamped in place by the casings 30, 31. The membrane 33 includes an annular bulge 51 for defining an annular recess and for increasing the resilience and flexibility of the membrane 33. The membrane 33 includes a center hole 55 (FIG. 3) for receiving a valve stem 32.

The casings 30, 31 each includes a valve opening 462 for slidably receiving the valve stem 32 and each includes a valve seat 464. Two valve elements, such as sealing rings 44, 45 are engaged on the valve stem 32 and provided on the opposite sides of the membrane 33 for engaging with the valve seats 464 and for blocking and opening the inlets 40, 41. The valve stem 32 includes a disc 36 for engaging with the membrane 33. A washer 38 is engaged on and secured to the valve stem 32 and is engaged with the membrane 33 for solidly securing the valve stem 32 and the membrane 33 together. The casing 30 includes a disc-shaped plate 301 formed on top thereof and having two punctures 34, 35 formed therein and communicating with the outlets 48 of the valve member 20. The other casing 31 includes a smaller size having the plate 301 of the casing 30 engaged on top thereof.

In operation, as shown in FIG. 4, when cold water and hot water are both supplied into the housing 21 via the inlets 22, the membrane 33 is balanced such that the cold water and the hot water may flow out through the valve openings 462 and the outlets 48 respectively. However, as shown in FIG. 5, when cold water is cut or is not supplied into the housing 21 via the inlet 41, the water pressure of the hot water from the inlet 40 may force the valve stem 32 rightward. At this moment, the valve element 44 may be forced to engage with the valve seat 464 of the casing 40 and to block the hot water such that the hot water may be prevented from flowing out through the outlet 48 and such that the mixing valve may prevent hot water from hurting the user. On the contrary, when hot water is cut off or is prevented from flowing into the housing 21 via the inlet 40, the water pressure of the cold water from the inlet 41 may force the valve element 45 to engage with the other valve seat 464 in order to prevent the cold water from flowing out through the outlet 48.

It is to be noted that the valve member 20 includes two separate casings 30, 31 such that the valve stem 32 and the membrane 33 may be easily secured and assembled in the casings 30, 31. The mixing valve thus includes a greatly simplified configuration for allowing the mixing valve to be easily manufactured and assembled. As shown in FIG. 1, the valve member 20 or the plate 301 of the casing 30 of the valve member 20 includes one or more orifices 52, 53 formed therein. The control valve 11 includes one or more protrusions 54 extended downward therefrom and engaged into the orifices 52, 53 of the valve member 20 for securing the control valve 11 to the valve member 20. One of the control valves 11 is disclosed in the applicant's prior U.S. Pat. No. 5,749,393 to Yang which is taken as a reference for the present invention.

Figure 7:
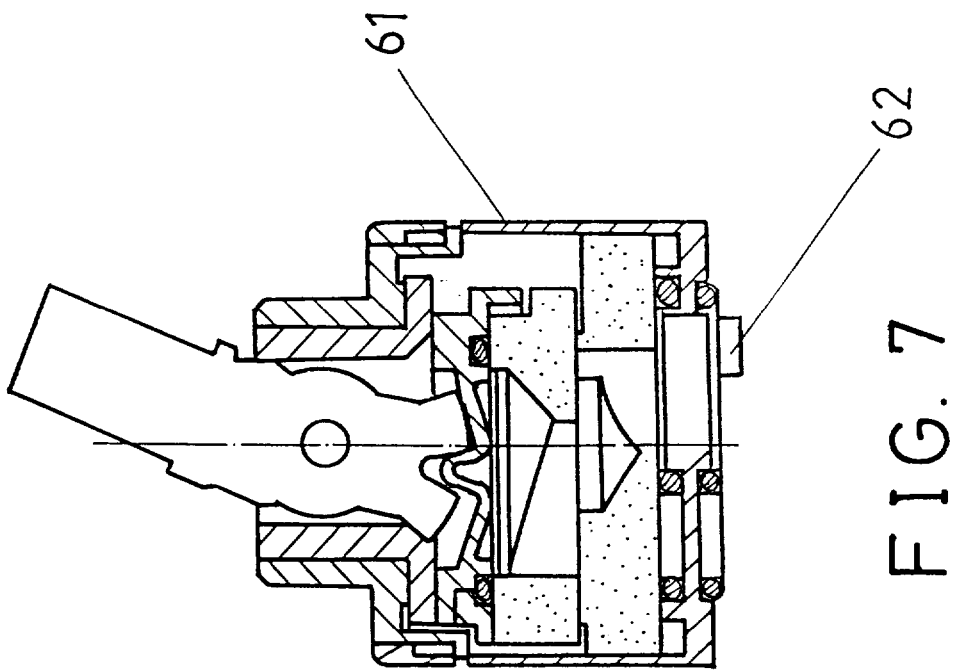
FIG. 7 is a cross sectional view illustrating another control valve that may be attached to the mixing valve.
Figure 6:
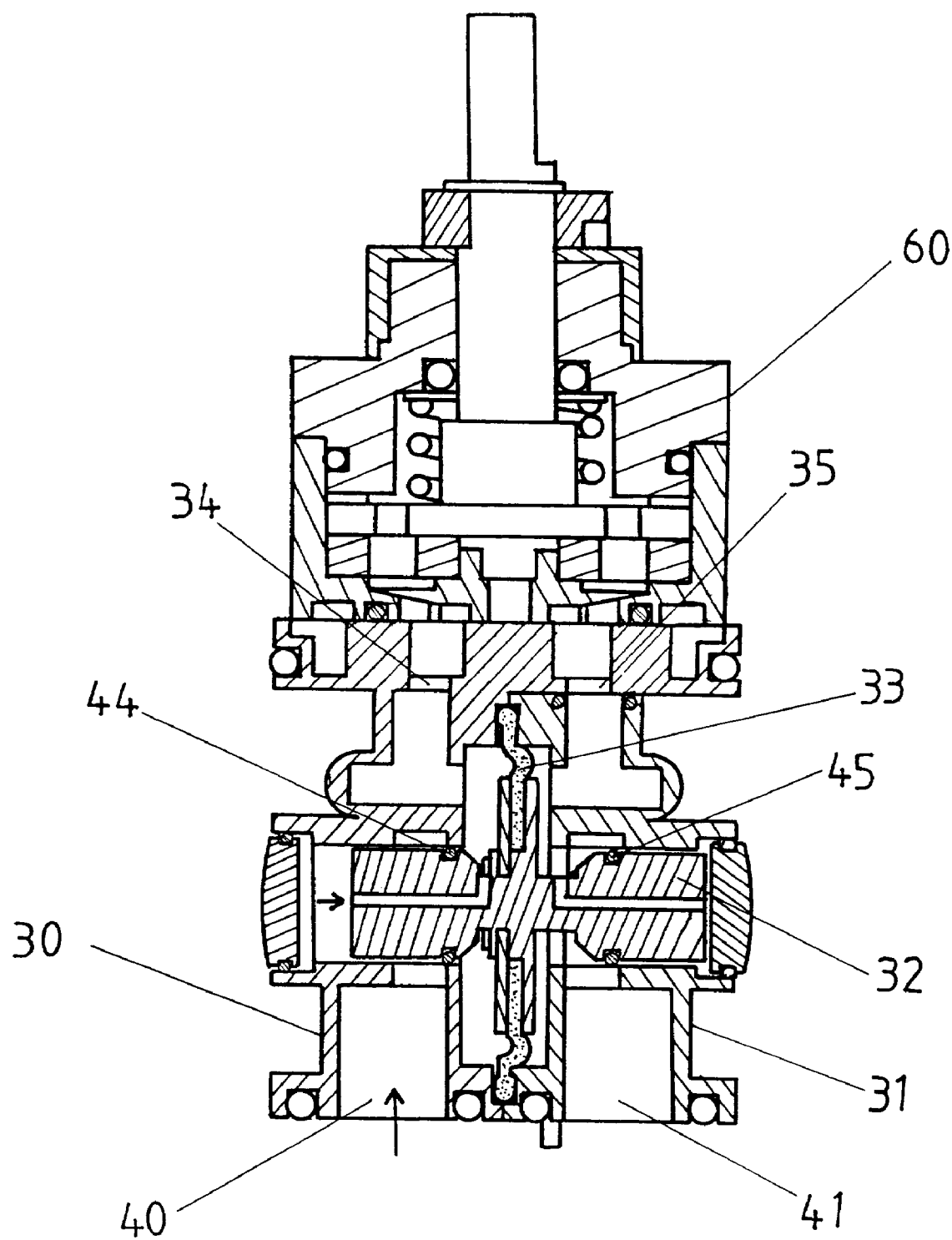
FIG. 6 is a cross sectional view illustrating the attachment of a control valve to the mixing valve.

Referring next to FIGS. 6 and 7, the so-called spring cartridge type control valve 60 (FIG. 6) or the ceramic cartridge type control valve 61 (FIG. 7) may also each include one or more protrusions 62 for engaging with the orifices 52, 53 of the valve member 20 and for exchangeably secured to the valve member 20.

Accordingly, the mixing valve in accordance with the present invention includes a greatly simplified mechanism for allowing the mixing valve to be easily manufactured and assembled and for preventing the user from being hurt by hot water inadvertently. The control valves for the mixing valve may be replaced or changed with each other easily.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mixing valve comprising:

a housing including two inlets for receiving cold water and hot water respectively, a valve member secured in said housing, said valve member including two casings secured together, said casings each including an inlet for communicating with said inlets of said housing and each including a valve opening and a valve seat and each including an annular shoulder, a first of said casings including a plate provided on top thereof, a second of said casings being disposed below said plate of said first casing and engaged with said plate of said first casing, said plate of said first casing including at least one orifice formed therein, a control valve engaged on top of said valve member and including at least one protrusion extended downward therefrom for engaging with said at least one orifice of said plate of said first casing and for attaching to said first casing of said valve member, a membrane including a peripheral bead engaged in said annular shoulders of said casings and secured in place by said casings, said membrane including an annular bulge for defining an annular recess and for increasing a resilience of said membrane, said membrane including a center hole, and a valve stem including two ends slidably engaged in said valve openings of said casings and including a middle portion engaged through said center hole of said membrane and secured to said membrane, said valve stem including two valve elements for engaging with said valve seats of said valve member, a first of said valve elements being caused to engage with a first of said valve seats for blocking the water from a first of said inlets of said housing when the cold water is not supplied to a second of said inlets of said housing.

* * * * *